Patented Sept. 4, 1945

2,384,180

UNITED STATES PATENT OFFICE 2,384,180

SEMISILICA BRICK

Hobart M. Kraner, Bethlehem, Pa., assignor to Bethlehem Steel Company, a corporation of Pennsylvania No Drawing. Application December 11, 1940, Serial No. 369,619

4 Claims. (Cl. 106—68)

This invention relates to an improved refractory brick, and more particularly to an improved semi-silica brick which at high temperatures will not spall or be deformed under load, and to a process for making such brick.

Fireclays are hydrous silicates of alumina formed by the natural decomposition of feldspar and other aluminum silicates. They are good refractories, and flint fire clay is notably so. But clay refractory bricks, even if of high flint fire clay content, will deform under load during continued use in such places as the crowns of blast furnace stoves and in the roofs of reheating furnaces. In reheating furnaces, therefore, especially if the roofs are of the sprung-arch type where the hot brick are under considerable pressure, insulation can be carried out only to a limited extent because of this deformation.

Siliceous rocks such as ganister, quartzite and sandstone, being composed with slight variation almost entirely (ca. 97% to 99%) of pure silica, $SiO_2$, are also in block and crushed form used to make refractories. A silica brick will not deform under load after the manner of clay brick, but since it will not withstand spalling it cannot be used in reheating furnaces, which are subject to intermittent operation.

Clay bonded silica bricks, commonly known as "Jersey clay bricks," are regarded as superior to either of the foregoing types, but having been made from naturally occurring materials of differing compositions are always of somewhat uncertain load strength and dubiously resistant to spalling.

The clays, in particular, may vary greatly. A high alkali content of the clay, in the form of potash ($K_2O$) and soda ($Na_2O$), when present in clay bricks or clay bonded bricks, tends to flux the material and to cause it to fail quickly under load. The effects of other impurities such as iron, calcium and magnesium compounds, though similar in kind, are somewhat less in degree. Hence for proper bonding a low alkali content of the clay is important. I have found that in practice it should never be more than 0.5%, and that a percentage only slightly higher—1.23% to be exact—reduces the heat resistance under load more than 200° F. The total of other impurities should not exceed 1 per cent.

The analysis of a suitable fire clay, with a good Alabama kaolin serving for example, shows the following results:

| | Per cent |
|---|---|
| Silica, $SiO_2$ | 44.74 |
| Alumina, $Al_2O_3$ | 39.47 |
| Titania, $TiO_2$ | 1.29 |
| Ferric oxide, $Fe_2O_3$ | 0.55 |
| Alkalies, $K_2O+Na_2O$ max | 0.22 |
| Lime, CaO, and magnesia, MgO | 0.16 |
| Other oxides | Trace |
| Loss on ignition | 13.89 |

Other proper clays, when of similarly low alkali content, have been found to be Pennsylvania or Missouri flint fire clay or Georgia kaolin.

My brick, however, consists principally of a ground rock, such as Medina quartzite or Pennsylvania ganister, of the quartzite group, with which sufficient low-alkali clay for bonding is intimately mixed. It accordingly contains from 80% to 90% of silica—usually about 88%—which is considerably above the silica content of standard Jersey bricks, the remainder being fire clay and a slight proportion of impurities.

The size of the grain to which the batch is ground and screened is also important. I have found that under heat a graduated mixture of coarse, intermediate and fine grain sizes will withstand spalling better than a mixture all of which is finely ground, and will support heavier loads than a very coarse mixture, due to the closer interstitial filling of the grains. The following mixture of grain sizings, for example, will give excellent load-bearing and spalling-resistant properties, together with a high resistance to heat:

| Mesh | | Percent |
|---|---|---|
| Smaller than | Larger than | |
| 4 | 6 | 10.0 |
| 6 | 10 | 16.2 |
| 10 | 28 | 20.7 |
| 28 | 65 | 17.1 |
| Smaller than | 65 | 36.0 |
| | | 100.0 |

About 9 per cent of water is added for temper. The bricks are formed in a mold, by power pressing to a pressure above 5000 pounds per square inch. 6600 pounds pressure has been successfully used. They are then fired to cone 15 or above, or upwards of 2615° F., the exact temperature depending to some extent on the purity of the materials used. I have found cones 16 to 18, 2669° to 2714° F., to be usually a good temperature range. This compares with a usual firing point of cone 14, or 2500° F., or less, for Jersey bricks, which have a correspondingly low fusing point.

Actual load tests, in fact, have shown that Jersey brick begins to fail, under 50 pounds per square inch load, at 2400° F. to 2500° F., as compared with 2650° or 2700° F. for my brick. And lineal deformation for my brick, under these conditions, at 2600° F. is under one per cent.

Although I have described my invention in considerable detail, I do not wish to be limited to the exact and specific materials and methods described, but may use such substitutions, modifications or equivalents, as are embraced within the scope of my invention, or as are pointed out in the claims. The term "quartzite," for instance, should be understood to include Pennsylvania ganister, Medina quartzite and all rock of like properties, while "clay" or "fireclay" includes Pennsylvania or Missouri flint fireclay, Alabama or Georgia kaolin, and other clays of like composition and behavior for the purposes at hand.

Having thus described my invention, what I claim as new and desire to secure by Letters Patent is:

1. A refractory brick containing 80% to 90% silica, comprising a quartzite of the group consisting of Pennsylvania ganister and Medina quartzite bonded with a fire clay of the group consisting of Pennsylvania and Missouri fireclay and Alabama and Georgia kaolin of less than 0.5% alkali content, the mixture ground to a graduated mesh fineness, shaped, and fired to a heat in the vicinity of cone 15.

2. A semi-silica brick, comprising a crushed quartzite rock of the group consisting of Pennsylvania ganister and Medina quartzite bonded with fire clay of the same group consisting of Pennsylvania and Missouri fire clay and Alabama and Georgia kaolin, the alkali content of the clay being less than 0.5%, the mixture, of 80% to 90% silica content, being ground, screened and graduated to coarse, intermediate and fine grain sizes substantially as follows: of mesh smaller than four and larger than six, 10 per cent; smaller than six and larger than ten, 16.2 per cent; smaller than ten and larger than twenty-eight, 20.7 per cent; smaller than twenty-eight and larger than sixty-five, 17.1 per cent; and smaller than sixty-five mesh, 36 per cent; said mixture after being pressed to form in mold being fired to cone 15 or above as required..

3. A semi-silica refractory brick suitable for lining parts of blast furnace stoves, reheating furnaces and the like, comprising a crushed quartzite rock of the group consisting of Pennsylvania ganister and Medina quartzite bonded with fire clay and approximately 9 per cent water to temper, the clay having substantially the following analysis: silica, 44.74 per cent; titania, 1.29 per cent; alumina, 39.47 per cent; ferric oxide, 0.55 per cent; lime and magnesia, 0.16 per cent; other impurities, trace; alkalies, under 0.5 per cent; loss on ignition, 13.89 per cent; the mixture, of 80 per cent to 90 per cent silica content, being ground, screened and graduated to coarse, intermediate and fine grain sizes substantially as follows: of mesh smaller than four and larger than six, 10 per cent; six and larger than ten, 16.2 per cent; smaller than twenty-eight and larger than sixty-five, 17.1 per cent; and smaller than sixty-five mesh, 36 per cent; said mixture after being pressed to form in a mold at a pressure in the vicinity of 6600 pounds per square inch being fired approximately between cones 16 to 18.

4. The process of making refractory bricks which consists of intimately mingling crushed quartzite rock of the group consisting of Pennsylvania ganister and Medina quartzite with sufficient water and fire clay of the group consisting of Pennsylvania and Missouri fire clay and Alabama and Georgia kaolin of less than 0.5% alkali content to bond the mixture; grinding and screening the mixture to graduated grain size substantially as follows: of mesh smaller than four and larger than six, 10 per cent; smaller than six and larger than ten, 16.2 per cent; smaller than ten and larger than twenty-eight, 20.7 per cent; smaller than twenty-eight and larger than sixty-five, 17.1 per cent; and smaller than sixty-five mesh, 36 per cent; said mixture being shaped in molds by a power press to a pressure over 5000 pounds per square inch, and the resultant bricks being fired between cones 16 and 18.

HOBART M. KRANER.

CERTIFICATE OF CORRECTION.

Patent No. 2,384,180. September 4, 1945.

HOBART M. KRANER.

It is hereby certified that error appears in the printed specification of the above numbered patent requiring correction as follows: Page 2, first column, line 43, claim 2, before the word "group" strike out "same"; page 2, second column, line 50, for "cones 16 and 18" read --cones 16 to 18--; and that the said Letters Patent should be read with this correction therein that the same may conform to the record of the case in the Patent Office.

Signed and sealed this 4th day of December, A. D. 1945.

Leslie Frazer (Seal) First Assistant Commissioner of Patents.

fully used. They are then fired to cone 15 or above, or upwards of 2615° F., the exact temperature depending to some extent on the purity of the materials used. I have found cones 16 to 18, 2669° to 2714° F., to be usually a good temperature range. This compares with a usual firing point of cone 14, or 2500° F., or less, for Jersey bricks, which have a correspondingly low fusing point.

Actual load tests, in fact, have shown that Jersey brick begins to fail, under 50 pounds per square inch load, at 2400° F. to 2500° F., as compared with 2650° or 2700° F. for my brick. And lineal deformation for my brick, under these conditions, at 2600° F. is under one per cent.

Although I have described my invention in considerable detail, I do not wish to be limited to the exact and specific materials and methods described, but may use such substitutions, modifications or equivalents, as are embraced within the scope of my invention, or as are pointed out in the claims. The term "quartzite," for instance, should be understood to include Pennsylvania ganister, Medina quartzite and all rock of like properties, while "clay" or "fireclay" includes Pennsylvania or Missouri flint fireclay, Alabama or Georgia kaolin, and other clays of like composition and behavior for the purposes at hand.

Having thus described my invention, what I claim as new and desire to secure by Letters Patent is:

1. A refractory brick containing 80% to 90% silica, comprising a quartzite of the group consisting of Pennsylvania ganister and Medina quartzite bonded with a fire clay of the group consisting of Pennsylvania and Missouri fireclay and Alabama and Georgia kaolin of less than 0.5% alkali content, the mixture ground to a graduated mesh fineness, shaped, and fired to a heat in the vicinity of cone 15.

2. A semi-silica brick, comprising a crushed quartzite rock of the group consisting of Pennsylvania ganister and Medina quartzite bonded with fire clay of the same group consisting of Pennsylvania and Missouri fire clay and Alabama and Georgia kaolin, the alkali content of the clay being less than 0.5%, the mixture, of 80% to 90% silica content, being ground, screened and graduated to coarse, intermediate and fine grain sizes substantially as follows: of mesh smaller than four and larger than six, 10 per cent; smaller than six and larger than ten, 16.2 per cent; smaller than ten and larger than twenty-eight, 20.7 per cent; smaller than twenty-eight and larger than sixty-five, 17.1 per cent; and smaller than sixty-five mesh, 36 per cent; said mixture after being pressed to form in mold being fired to cone 15 or above as required.

3. A semi-silica refractory brick suitable for lining parts of blast furnace stoves, reheating furnaces and the like, comprising a crushed quartzite rock of the group consisting of Pennsylvania ganister and Medina quartzite bonded with fire clay and approximately 9 per cent water to temper, the clay having substantially the following analysis: silica, 44.74 per cent; titania, 1.29 per cent; alumina, 39.47 per cent; ferric oxide, 0.55 per cent; lime and magnesia, 0.16 per cent; other impurities, trace; alkalies, under 0.5 per cent; loss on ignition, 13.89 per cent; the mixture, of 80 per cent to 90 per cent silica content, being ground, screened and graduated to coarse, intermediate and fine grain sizes substantially as follows: of mesh smaller than four and larger than six, 10 per cent; six and larger than ten, 16.2 per cent; smaller than twenty-eight and larger than sixty-five, 17.1 per cent; and smaller than sixty-five mesh, 36 per cent; said mixture after being pressed to form in a mold at a pressure in the vicinity of 6600 pounds per square inch being fired approximately between cones 16 to 18.

4. The process of making refractory bricks which consists of intimately mingling crushed quartzite rock of the group consisting of Pennsylvania ganister and Medina quartzite with sufficient water and fire clay of the group consisting of Pennsylvania and Missouri fire clay and Alabama and Georgia kaolin of less than 0.5% alkali content to bond the mixture; grinding and screening the mixture to graduated grain size substantially as follows: of mesh smaller than four and larger than six, 10 per cent; smaller than six and larger than ten, 16.2 per cent; smaller than ten and larger than twenty-eight, 20.7 per cent; smaller than twenty-eight and larger than sixty-five, 17.1 per cent; and smaller than sixty-five mesh, 36 per cent; said mixture being shaped in molds by a power press to a pressure over 5000 pounds per square inch, and the resultant bricks being fired between cones 16 and 18.

HOBART M. KRANER.

CERTIFICATE OF CORRECTION.

Patent No. 2,384,180.   September 4, 1945.

HOBART M. KRANER.

It is hereby certified that error appears in the printed specification of the above numbered patent requiring correction as follows: Page 2, first column, line 43, claim 2, before the word "group" strike out "same"; page 2, second column, line 50, for "cones 16 and 18" read --cones 16 to 18--; and that the said Letters Patent should be read with this correction therein that the same may conform to the record of the case in the Patent Office.

Signed and sealed this 4th day of December, A. D. 1945.

Leslie Frazer (Seal)            First Assistant Commissioner of Patents.